UNITED STATES PATENT OFFICE.

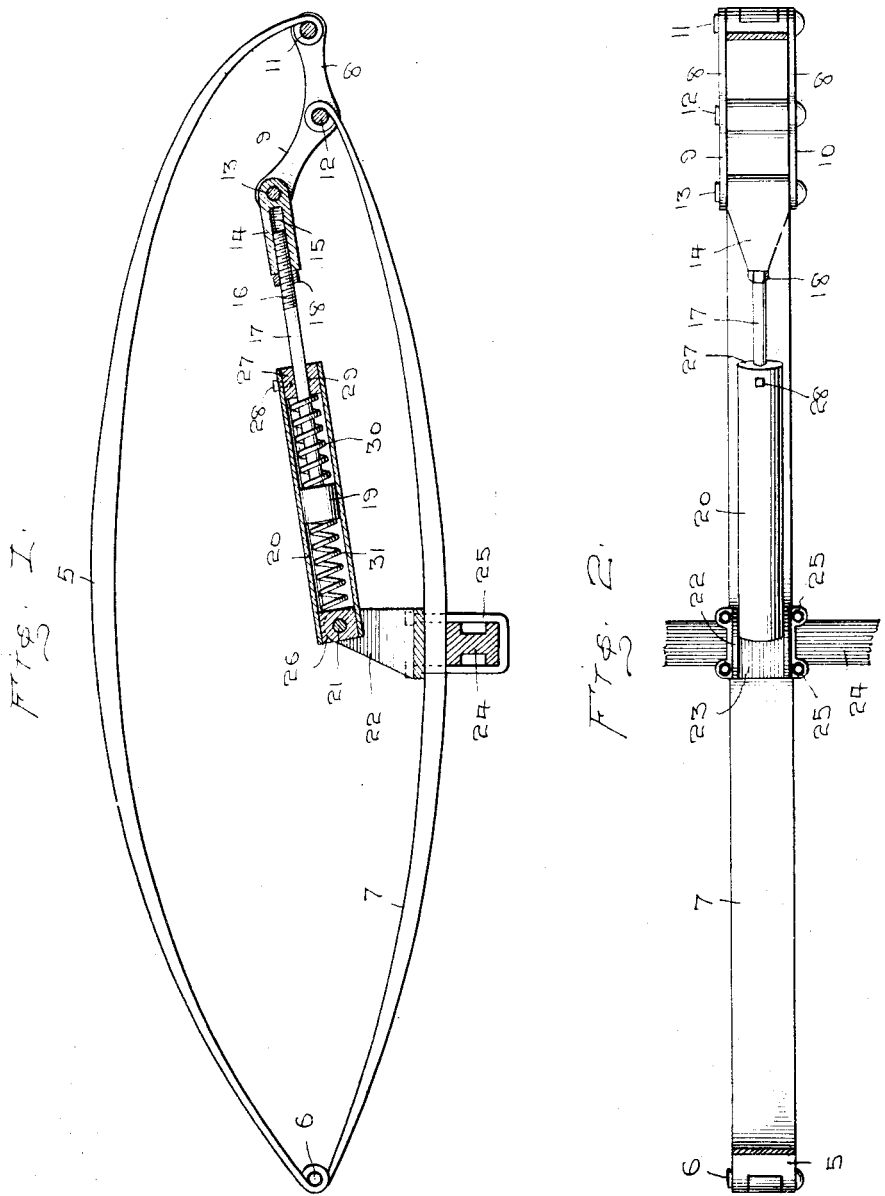

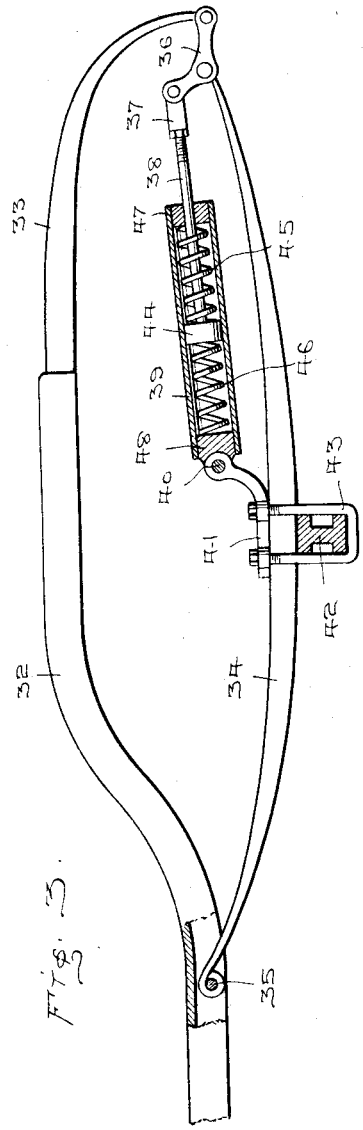

ARTHUR SEMMIG, OF WHITE PLAINS, NEW YORK.

SHOCK-ABSORBER FOR VEHICLES.

1,138,017.   Specification of Letters Patent.   Patented May 4, 1915.

Application filed April 16, 1914. Serial No. 832,275.

*To all whom it may concern:*

Be it known that I, ARTHUR SEMMIG, a citizen of the United States, residing at White Plains in the county of Westchester and State of New York, have invented certain new and useful Improvements in Shock-Absorbers for Vehicles; and I do hereby declare the following to be a full, clear, and exact description of the invention, such as will enable others skilled in the art to which it appertains to make and use the same.

This invention comprehends broadly improvements in shock absorbers and has particular reference to devices of such character as are adapted to be connected with the elliptical leaf springs of a vehicle.

As a principal object this invention contemplates the provision of a shock absorber which shall be readily installed in an automobile or other vehicle and it will take up the strain of any shock due to inequalities of the road surface so gradually as not to transmit any of such shock to the body of the vehicle.

A further object is the provision of a shock absorber which shall take up all sudden strains incident to the travel of the vehicle on a road by means of an alternate compression and expansion of suitable coil springs directly connected to the elliptical leaf springs of the vehicle in a prompt sure and efficient manner.

An object of equal importance with the foregoing is to provide a shock absorber of the type described which is constructed with such regard to proportion, number and arrangement of parts as to be cheaply manufactured will be durable and efficient in operation and may readily be installed upon any standard type of automobile or other vehicle with a small expenditure of time and labor and without requiring any alteration in the construction of the latter.

The above and additional objects are accomplished by such means as are illustrated in the accompanying drawings and described in the following specification and then more particularly pointed out in the claims which are appended hereto and form a part of this application.

With reference to the drawings wherein I have illustrated the preferred embodiments of my invention as it is reduced to practice and throughout several views of which like characters of reference designate similar parts, Figure 1, is a side elevation of my shock absorber interconnected with the ordinary elliptical leaf springs and adapted to be applied to any vehicle, Fig. 2, is a center horizontal sectional view of the matter shown in Fig. 1 and Fig. 3, is an elevational view of my shock absorber as applied to the rear springs of an automobile and supported by the frame thereon.

Proceeding now to the description of the drawings and having particular reference to the disclosures of Fig. 1, the numeral 5, designates the upper portion of a set of elliptical leaf springs connected at one end in the usual manner by means of the pins 6, to the lower portion 7, of the set of springs. Instead of a connection at the opposite end similar to the connecting means 6, I make use of a peculiar construction which is very important in attaining the object above set forth and which comprises mainly the double bell crank lever or rocker arm 8. This lever 8, is substantially L-shaped and comprises two similar members 9 and 10 which are connected by the pivot pins 11, 12 and 13.

To the outer most pivot 11 the extremity of the upper portion 5, of the set of elliptical springs is secured. To the center pin 12, is similarly secured the lower portion 7 of the set of springs and to the inner most pin 13, is pivoted the keeper or socket member 14. This socket member is provided with the longitudinal recess 15, which is screw threaded to adjustably receive the correspondingly threaded extremity 16 of the piston rod 17, which is further secured in place by the lock nut 18.

The piston rod 17, is the basic element of my invention and carries at its free extremity, the piston head 19, which is slidably positioned in the metallic tube 20. This tube 20, is pivotally supported at 21, between the ears 22 of the U-shaped member 23 which is located in the center of the lower set of springs 7 and secured to the axle 24 by means of suitable U-bolts 25.

The cylindrical tube 20 is provided at either end with the internal bushings 26 and 27, which are suitably secured flush with the open ends by any desirable means 28. The bushing 27, which is positioned in the free or nonpivoted end of the cylinder 20 is apertured as at 29 to slidably receive the piston rod 17. Positioned within the cylinder 20 I preferably provide the powerful coil springs 30 and 31 the former being coiled around the piston shaft 17 and disposed between the piston head 19 and the bushing 27, while the latter bears against the piston head 19 in one direction and against the bushing 26 in the other. These coil springs are oppositely expansible and it will readily be seen that when the spring 30 is compressed that the spring 31 will expand and vice versa.

The operation of my shock absorber, the construction of which has been fully described in the foregoing will be readily apparent upon a perusal of the drawings. When any obstacle is encountered by the vehicle in its travel the sets of springs 5 and 7 will be compressed toward each other by the upward thrust imparted to the lower spring 7 through the wheels and by the inertia of the car body due to the weight thereof acting upon the upper spring 5, and both springs will thus operate upon the double bell crank 8 at different points. This compression will result in a partial movement of the end carrying the pivot 13 and a consequent movement of the piston rod 17 is accomplished. This movement of the piston rod, however, will result in and will be resisted by the compression of the spring 30 to retard the movement and eventually the spring 30 will thereupon expand and force the piston head 19 farther into the cylinder 20 until this movement is stopped by the consequent compression of the spring 31. Accordingly it will be seen that when any sudden shock is encountered that the alternate compression and expansion of the spring contained in the cylinder 20 will gradually take up the strain until the piston head 19 is finally brought to a stop and made to assume the normal position illustrated in Fig. 1.

Turning now to the modification of my device illustrated in Fig. 3 it will be seen that essentially the same principle is involved in the operation of the modified form which is embodied in the form previously described.

Referring to Fig. 3 the numeral 32 designates the rear frame member of the chassis upon which is mounted the partial upper portion 33 of the set of elliptical springs the lower portion 34 of the set being connected to the frame 32 in the usual manner as shown at 35 and the adjacent extremities of the two portions 33 and 34 are connected to a double bell crank 36 in a manner similar to the form described above. The rest of the invention as adapted for use in this modification includes the socket member 37 pivoted to the shackle or double bell crank 36, the piston rod 38 threadingly received by the socket member 37, the cylinder 39 pivoted at 40 to a member 41 which is secured to the rear axle 42 by suitable U-bolts 43, the piston head 44 slidable in the cylinder 39 and the springs 45 and 46 disposed on opposite sides of the piston head and bearing against the bushings 47 and 48. In all respects the operation of this form shown in Fig. 3 is similar to that already described in connection with the form shown in Figs. 1 and 2.

While in the foregoing I have illustrated in the drawings and described in the specification such combination and arrangement of elements as constitute the preferred embodiment of my invention and the principal adaptations in the use thereof, I desire to emphasize the fact that I may make such minor changes in the matters of proportion and degree in later forms of my shock absorber as shall not alter the spirit of my invention as defined in the appended claims.

What I claim is:

1. In a shock absorber, a cylinder positioned between the elliptical leaf springs of a vehicle, pivotal connections between one end of said cylinder and the axle of the vehicle, a piston slidably mounted in said cylinder, oppositely disposed yieldable means operating upon said piston within said cylinder, a bell crank lever pivotally connected at its center and at one end respectively to the lower and upper portions of said elliptical springs and means pivotally mounted at the other extremity of said bell crank for adjusting said piston longitudinally.

2. In a shock absorber the combination with a pair of elliptical leaf springs for a vehicle, of a cylinder having open ends, bushings secured in said open ends, pivotal connections between one of said bushings and the axle of the vehicle, a piston rod slidably mounted in said cylinder and working through an aperture in the other of said bushings, a socket member adjustably receiving the end of said piston rod, a piston head for said rod, oppositely expansible resilient means positioned in said cylinder to operate upon said piston head and means pivotally connecting said socket member with the adjacent ends of each of the leaf springs forming said elliptical springs of the vehicle.

3. In a shock absorber the combination with the elliptical leaf springs of a vehicle of a double bell crank lever, means carried by said lever for pivotally linking adjacent ends of said leaf springs, a socket member also pivotally connected to said bell crank lever, a piston rod adjustably received by said socket member, a piston head for said rod, an open ended cylinder slidably receiving said piston head, bushings secured in said open ends, one of said bushings being apertured to receive said rod, pivotal connections between the other of said busings and the axle of the vehicle and a pair of yieldable means positioned in said cylinder and oppositely disposed with respect to said piston head.

In testimony whereof I have signed my name to this specification in the presence of two subscribing witnesses.

ARTHUR SEMMIG.

Witnesses:
CHARLES L. PRIGGE,
CLAYTON A. HAVILAND.